(12) United States Patent
Shimotsu

(10) Patent No.: US 7,609,921 B2
(45) Date of Patent: Oct. 27, 2009

(54) OPTICAL FIBER PART AND LASER PROCESSING MACHINE

(75) Inventor: Shinichi Shimotsu, Ashigarakami-gun (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 12/359,679

(22) Filed: Jan. 26, 2009

(65) Prior Publication Data

US 2009/0190884 A1 Jul. 30, 2009

(30) Foreign Application Priority Data

Jan. 25, 2008 (JP) .............................. 2008-014745

(51) Int. Cl.
G02B 6/26 (2006.01)
(52) U.S. Cl. .............................. 385/43; 385/27; 385/31; 385/38; 385/123; 385/128
(58) Field of Classification Search ............... 385/27–2, 385/31, 38, 43, 123, 126–128
See application file for complete search history.

(56) References Cited

U.S. PATENT DOCUMENTS

| | | | |
|---|---|---|---|
| 5,309,330 A | 5/1994 | Pillers et al. | |
| 5,729,643 A | 3/1998 | Hmelar et al. | |
| 6,330,382 B1 * | 12/2001 | Harshbarger et al. | 385/28 |
| 6,409,391 B1 * | 6/2002 | Chang | 385/53 |
| 2002/0076153 A1 | 6/2002 | Hollister et al. | |
| 2003/0133687 A1 | 7/2003 | Han et al. | |
| 2003/0210725 A1 * | 11/2003 | Prassas et al. | 372/50 |
| 2009/0053515 A1 * | 2/2009 | Luo et al. | 428/339 |
| 2009/0080835 A1 * | 3/2009 | Frith | 385/50 |

FOREIGN PATENT DOCUMENTS

| | | |
|---|---|---|
| JP | 2003-248141 | 9/2003 |
| WO | 00-62109 A1 | 10/2000 |

* cited by examiner

Primary Examiner—Frank G Font
Assistant Examiner—Michael P Mooney
(74) Attorney, Agent, or Firm—Sughrue Mion, PLLC

(57) ABSTRACT

An optical fiber part includes an optical fiber having a main fiber, a taper fiber and a small-diameter fiber. The core diameter of the taper fiber decreases along an optical axis. Further, a heat-radiation silicon adhesive that is a highly heat-conductive material having heat conductivity of 4 W/m·K or higher has been applied to the entire area of the outer circumference of the taper fiber and a part of the small-diameter fiber next to the taper fiber. An input end of the optical fiber is connected to a semiconductor laser having an output power of 10 W. Light output from the laser propagates through the optical fiber and output from the output end. A part of light that has propagated through the main fiber and entered the taper fiber is output through the cladding thereof. Heat generated by light output from the cladding is transferred through the heat-radiation silicon adhesive and radiated.

9 Claims, 2 Drawing Sheets

OPTICAL FIBER PART AND LASER PROCESSING MACHINE

BACKGROUND OF THE INVENTION

1. Field of the Invention

The present invention relates to an optical fiber part that includes an optical fiber having a taper fiber portion and a laser processing machine that includes the optical fiber part.

2. Description of the Related Art

Conventionally, laser processing machines have been used in various fields, such as printing and processing. Further, in recent years, high-output semiconductor lasers were realized, and optical fiber parts that transmit, through optical fibers, high-output laser light that has been output from the high-output semiconductor lasers, and output the high-output laser light are known. Further, as described in Japanese Unexamined Patent Publication No. 2003-248141, when the optical fiber parts are used, the ends (leading ends) of the optical fibers are attached and fixed into V-shaped grooves or the like in many cases. Further, use of such optical fiber parts in laser processing machines is being studied.

Further, an optical fiber that has a taper fiber portion at the leading end thereof is well known. The taper fiber portion has a core having a core diameter that decreases along an optical axis so as to output light that has a small beam diameter. For example, a taper fiber portion (taper fiber) that has a core having a core diameter decreasing from 105 μm to 60 μm and a cladding having an outer diameter thereof decreasing from 125 μm to 80 μm may be formed at the leading end of a main fiber in the following manner. A main fiber that has a core diameter of 105 μm and an outer diameter of the fiber of 125 μm is heated and stretched at the leading end thereof, and cut at a certain position, thereby forming the taper fiber.

Normally, when the NA (numerical aperture) (divergence angle) of a taper fiber (T) is NA(T), and the NA of a main fiber (main), which is a parent material (base material), is NA(main), and the core diameter of the taper fiber on the light incident side (input side) is Din, and the core diameter of the taper fiber on the light output side is Dout, the following equation is satisfied:

$$NA(T)=NA(main) \div (Din/Dout).$$

When this equation is applied to the aforementioned example, $$NA(T)=NA(main) \div (105/60)=0.57\ NA(main).$$

Therefore, light that has propagated through the main fiber and entered the taper fiber at an angle greater than 0.57 NA(main) cannot propagate through the taper fiber, and is radiated (output) to the outside of the fiber through the cladding.

For example, when the taper fiber is attached and fixed into a V-shaped groove, as described in Japanese Unexamined Patent Publication No. 2003-248141, and especially when an epoxy-based adhesive or the like that has low heat conductivity is used to attach and fix the taper fiber, the light output through the cladding of the taper fiber is absorbed by the epoxy-based adhesive. Consequently, the temperature of the adhesive increases, and there is a risk that the quality of the adhesive changes and deteriorates.

SUMMARY OF THE INVENTION

In view of the foregoing circumstances, it is an object of the present invention to provide an optical fiber part that includes an optical fiber having a taper fiber, and that can suppress an increase in the temperature of the outer circumference of the taper fiber and in the vicinity thereof due to light output from the taper fiber through the cladding thereof. Further, it is another object of the present invention to provide a laser processing machine using the optical fiber part.

An optical fiber part according to the present invention is an optical fiber part comprising:

an optical fiber including a main fiber, a taper fiber and a small-diameter fiber; and a heat radiation structure that is provided at the outer circumference of the taper fiber, wherein the main fiber includes a core having a first core diameter, and wherein the taper fiber is connected to one of the ends of the main fiber and includes a core having a core diameter that decreases along an optical axis from the first core diameter to a second core diameter that is smaller than the first core diameter, and wherein the small-diameter fiber is connected to one of the ends of the taper fiber and includes a core having the second core diameter.

The expression "the taper fiber is connected to one of the ends of the main fiber" means that the taper fiber and the main fiber may be formed together as a monolithic body, thereby being connected to each other. Alternatively, the taper fiber may be connected to the end of the main fiber by fusion splicing or the like. Similarly, the expression "the small-diameter fiber is connected to one of the ends of the taper fiber" means that the small-diameter fiber and the taper fiber may be formed together as a monolithic body, thereby being connected to each other. Alternatively, the small-diameter fiber may be connected to the end of the taper fiber by fusion splicing or the like.

Further, the heat radiation structure may be made of a highly heat-conductive material having heat conductivity of 3 W/m·K or higher that is in contact with the outer circumference of the taper fiber.

Here, the expression "a highly heat-conductive material . . . is in contact with the outer circumference of the taper fiber" means that the highly heat-conductive material is in contact with at least a part of the outer circumference of the taper fiber.

The highly heat-conductive material may be in contact with the entire area of the outer circumference of the taper fiber. Alternatively, the highly heat-conductive material in line form or in mesh or grid form may be evenly placed in contact with the outer circumference of the taper fiber.

Further, the highly heat-conductive material may be applied to the outer circumference of the taper fiber to coat the outer circumference.

Further, when the small-diameter fiber has a bent portion (or a portion that has been bent in circle form or the like), the heat radiation structure may be provided at the outer circumference of the bent portion.

The heat radiation structure may be made of a highly heat-conductive material having heat conductivity of 3 W/m·K or higher that is in contact with the outer circumference of the bent portion.

The expression "a highly heat-conductive material . . . is in contact with the outer circumference of the bent portion" means that the highly heat-conductive material is in contact with at least a part of the outer circumference of the bent portion of the small-diameter fiber.

The highly heat-conductive material may be in contact with the entire area of the outer circumference of the bent portion. Alternatively, the highly heat-conductive material in line form or in mesh or grid form may be evenly placed in contact with the outer circumference of the bent portion.

Further, the highly heat-conductive material may be applied to the outer circumference of the bent portion to coat the outer circumference.

Further, in the optical fiber part according to the present invention, a transparent member for protecting an end surface may be attached to an output end surface thereof by optical contact. Further, an anti-reflection coating may be provided on the output-side surface of the transparent member for protecting the end surface. Further, the power of light output from the optical fiber may be greater than or equal to 1 W.

Further, a laser processing machine according to the present invention is a laser processing machine comprising:
the optical fiber part according to the present invention; and
a laser that outputs laser light to be transmitted through the optical fiber part.

An optical fiber part according to the present invention is an optical fiber part comprising:
an optical fiber including a main fiber, a taper fiber and a small-diameter fiber; and
a heat radiation structure that is provided at the outer circumference of the taper fiber, wherein the main fiber includes a core having a first core diameter, and wherein the taper fiber is connected to one of the ends of the main fiber and includes a core having a core diameter that decreases along an optical axis from the first core diameter to a second core diameter that is smaller than the first core diameter, and wherein the small-diameter fiber is connected to one of the ends of the taper fiber and includes a core having the second core diameter. Therefore, heat generated at the outer circumference of the taper fiber and in the vicinity thereof due to light output through the cladding of the taper fiber is radiated (output or released) therefrom. Therefore, it is possible to suppress an increase in the temperature at the outer circumference of the taper fiber and in the vicinity thereof.

Further, when the heat radiation structure is made of a highly heat-conductive material having heat conductivity of 3 W/m·K or higher that is in contact with the outer circumference of the taper fiber, heat generated at the outer circumference of the taper fiber and in the vicinity thereof is efficiently conducted (transferred or transmitted). Therefore, heat does not remain in the vicinity of the outer circumference of the taper fiber, thereby suppressing an increase in the temperature at the outer circumference of the taper fiber and in the vicinity thereof.

Further, when the highly heat-conductive material has been applied to the outer circumference of the taper fiber to coat the outer circumference, there is low risk that the highly heat-conductive material detaches or drops out of the taper fiber. Hence, it is possible to make the optical fiber part more reliable.

Further, when the small-diameter fiber has a bent portion, and the heat radiation structure is provided at the outer circumference of the bent portion, light that propagates through the cladding is output from the cladding at the bent portion. Therefore, it is possible to prevent light that propagates through the cladding from being output, as noise light, from the output end of the optical fiber. Further, it is possible to prevent the temperature at the outer circumference of the bent portion and in the vicinity thereof from becoming higher due to light output from the cladding at the bent portion.

Further, when the heat radiation structure is made of a highly heat-conductive material having heat conductivity of 3 W/m·K or higher that is in contact with the outer circumference of the bent portion, heat generated at the outer circumference of the bent portion and in the vicinity thereof is efficiently conducted. Therefore, heat does not remain in the vicinity of the outer circumference of the bent portion, thereby suppressing an increase in the temperature at the outer circumference of the bent portion and in the vicinity thereof. Further, when the highly heat-conductive material has been applied to the outer circumference of the bent portion to coat the outer circumference, there is low risk that the highly heat-conductive material detaches from the bent portion. Hence, it is possible to make the optical fiber part more reliable.

Further, since the laser processing machine of the present invention includes the optical fiber part as described above and a laser that outputs laser light to be transmitted through the optical fiber part, it is possible to suppress an increase in the temperature at the outer circumference of the taper fiber in the optical fiber part and in the vicinity thereof. Hence, it is possible to make the laser processing machine more reliable.

DESCRIPTION OF THE PREFERRED EMBODIMENTS

Figure 1:
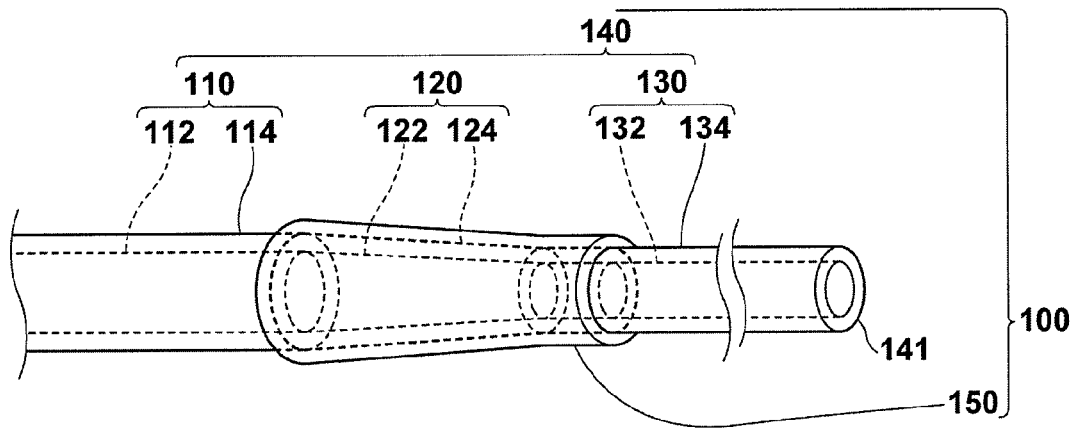
FIG. 1 is a schematic diagram illustrating a first embodiment of the present invention.

An optical fiber part according to a first embodiment of the present invention will be described with reference to the drawings. FIG. 1 is a schematic diagram illustrating the structure of an optical fiber part 100.

As illustrated in FIG. 1, the optical fiber part 100 includes an optical fiber 140 and a heat-radiation silicon adhesive 150. The optical fiber 140 includes a main fiber 110, a taper fiber 120 and a small-diameter fiber 130. The main fiber 110 includes a core 112 that has a core diameter of 105 μm and a cladding (clad) 114 that has an outer diameter of 125 μm. The taper fiber 120 includes a core 122 having a core diameter that decreases from 105 μm to 60 μm and a cladding 124 having an outer diameter that decreases from 125 μm to 80 μm. The small-diameter fiber 130 includes a core 132 that has a core diameter of 60 μm and a cladding 134 that has an outer diameter of 80 μm. Further, the heat-radiation silicon adhesive 150 has been applied to the outer circumference of the taper fiber 120 and to a part of the small-diameter fiber 130, which is next to the taper fiber 120. Each of all the fibers is a multimode fiber.

The taper fiber 120 is formed at one of the ends of the main fiber 110 (the leading end of the main fiber 110) by heating and stretching the end of the main fiber 110, which has a core diameter of 105 μm and an outer diameter of 125 μm, and by cutting the stretched fiber at a certain position. When the taper fiber 120 is formed, it is desirable that the process is carried out at temperature that is as low as possible and in short time. That is because if excess heat is applied, dopant in the cladding of the fiber disperses (spreads) by heat diffusion, and the cladding becomes weak, thereby increasing a radiation loss. For example, when a taper fiber is formed at an end of a multimode fiber having a fluorine-doped cladding, it is desirable that the temperature is 1400° C. or less and time for forming the taper fiber is 60 S (60 seconds) or less. Further, the small-diameter fiber 130 is attached to the leading end (end) of the taper fiber 120 by fusion splicing.

The heat-radiation silicon adhesive 150 is a highly heat-conductive material having heat conductivity of 4 W/m·K. The heat-radiation silicon adhesive 150 has been applied to the entire area of the outer circumference of the taper fiber 120 and to a part of the small-diameter fiber 130, which is next to the taper fiber 120. The adhesive strength of the heat-radiation silicon adhesive 150 is lower than the adhesive strengths of epoxy-based adhesives. Further, the viscosity of the heat-radiation silicon adhesive 150 is higher than the viscosities of the epoxy-based adhesives. Therefore, the heat-radiation silicon adhesive 150 is not appropriate when accurate positioning is required or the like. However, in the present embodiment, in which accurate positioning is not required, the heat-radiation silicon adhesive 150 can be used without causing problems. Further, since the heat-radiation silicon adhesive 150, which is a highly heat-conductive material having heat conductivity of 4 W/m·K, has been applied to the entire area of the outer circumference of the taper fiber 120 and to the part of the small-diameter fiber 130, which is next to the taper fiber 120, the surface of the heat-radiation silicon adhesive 150, the surface in contact with outer air, increases, thereby enhancing the heat radiation effect thereof.

The optical fiber part 100 is connected to a semiconductor laser (not illustrated) that has output power of 10 W. Specifically, one end (not illustrated) of the optical fiber 140, the end being opposite to an output end 141 of the optical fiber 140, is connected to the semiconductor laser. The semiconductor laser and the optical fiber part 100 function as a laser processing machine according to the present invention. Laser light output from the semiconductor laser propagates through the optical fiber 140 and is output from the output end 141 of the optical fiber 140.

In the present embodiment, the heat-radiation silicon adhesive 150, which is a highly heat-conductive material (good conductor) having heat conductivity of 4 W/m·K, has been applied to the entire area of the outer circumference of the taper fiber 120 and to the part of the small-diameter fiber 130, which is next to the taper fiber 120. Therefore, the surface of the heat-radiation silicon adhesive 150, the surface in contact with outer air, increases, thereby enhancing the heat radiation effect thereof. Therefore, it is possible to prevent the temperature at the outer circumference of the taper fiber 120 and in the vicinity thereof from becoming higher due to light output through the cladding of the taper fiber 120. Here, a part of light that could not propagate in the taper fiber 120 and leaked to the cladding propagates also into the cladding of the small-diameter fiber 130, which is attached to the taper fiber 120 by fusion splicing. Further, the light propagated into the cladding of the small-diameter fiber 130 is output (radiated) to the outside of the optical fiber therefrom. Therefore, it is desirable that the heat-radiation silicon adhesive 150 is applied also to the outer circumference of the small-diameter fiber 130 in the vicinity of the taper fiber 120 in addition to the outer circumference of the taper fiber 120 to enhance the heat radiation effect.

Further, since the heat-radiation silicon adhesive 150 has been applied to the outer circumference of the taper fiber 120 and to the part of the small-diameter fiber 130, which is next to the taper fiber 120, there is low risk that the heat-radiation silicon adhesive 150 detaches from the outer circumference of the taper fiber 120 and the part of the small-diameter fiber 130, which is next to the taper fiber 120. Hence, the reliability of the optical fiber part 100 is improved.

Figure 2:
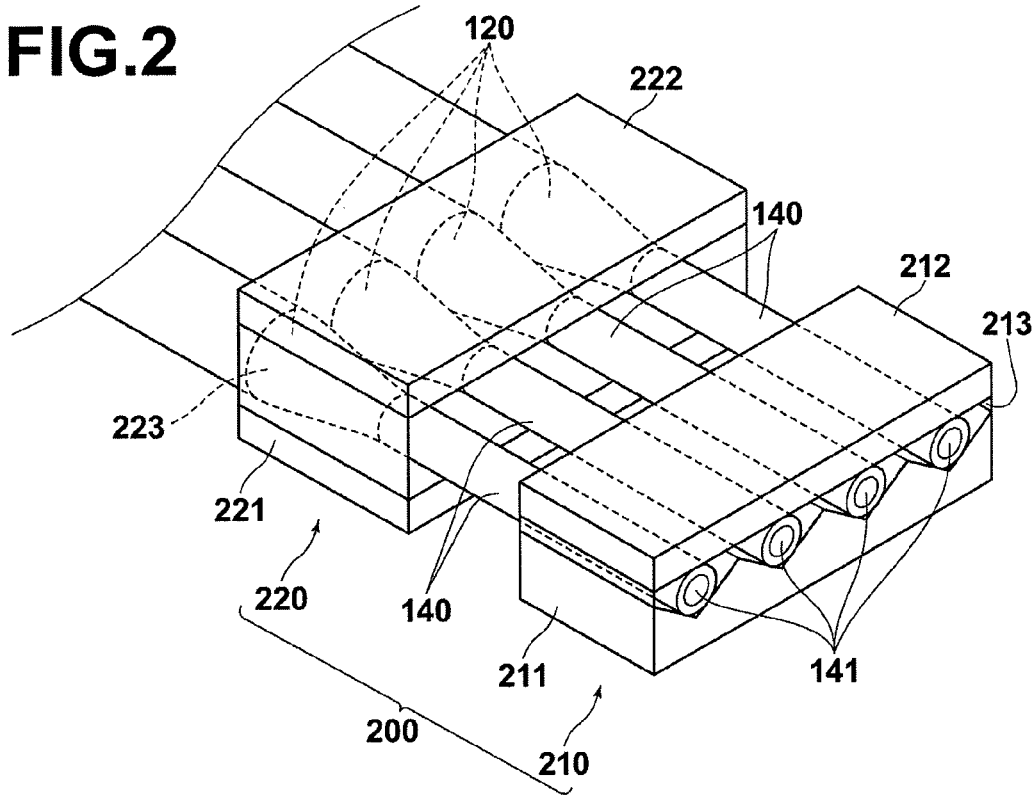
FIG. 2 is a schematic diagram illustrating a second embodiment of the present invention.

Next, an optical fiber part according to a second embodiment of the present invention will be described. FIG. 2 is a schematic diagram illustrating the structure of an optical fiber part 200. In FIG. 2, the same reference numerals as those used in the optical fiber part 100, illustrated in FIG. 1, will be assigned to the corresponding elements, and the explanation thereof will be omitted.

The optical fiber part 200 includes four optical fibers 140, an end fixing unit 210, and a taper fixing unit 220. The leading end (output end) 141 of each of the optical fibers 140 is fixed into the end fixing unit 210. Further, the taper fiber 120 of each of the optical fibers 140 is fixed into the taper fixing unit 220.

In the end fixing unit 210, the leading end of each of the optical fibers 140 is fixed, with an epoxy-based adhesive 213, between each of V-shaped grooves of a substrate 211 having four V-shaped grooves and a pressure plate 212. The epoxy-based adhesive 213 has disadvantages that the heat conductivity is low, and that the quality deteriorates at approximately 200° C. At the same time, the epoxy-based adhesive 213 has advantages that the adhesive strength is high, and that the viscosity is low. In the present embodiment, the leading end 141 of each of the optical fibers 140 is formed by the small-diameter fiber 130. Therefore, light is not substantially output from the cladding of the leading end 141. Hence, the temperature of the epoxy-based adhesive 213 does not increase, and the quality thereof does not deteriorate. Meanwhile, it is necessary to accurately position the leading end 141 of each of the optical fibers 140 with respect to the substrate 211 having the V-shaped grooves. Therefore, the epoxy-based adhesive that has high adhesive strength and low viscosity is appropriate.

In the taper fixing unit 220, the taper fiber 120 of each of the optical fibers 140 and a part of the small-diameter fiber 130 of each of the optical fibers 140, the small diameter fiber 130 being next to the taper fiber 120, are fixed between a pressure plate 221 and a pressure plate 222. The taper fiber 120 and the part of the small-diameter fiber 130 are fixed using heat-radiation silicon adhesive 223. The pressure plate 221 and the pressure plate 222 are made of aluminum. Since the heat conductivity of aluminum is 203 W/m·K, the pressure plate 221 and the pressure plate 222 function also as heat radiation plates. Further, the taper fixing unit 220 functions as a heat radiation structure of the present invention.

In the present embodiment, the heat-radiation silicon adhesive 223, which is a highly heat-conductive material (good conductor) having heat conductivity of 4 W/m·K, has been applied to the outer circumference of each of the taper fibers 120 and to the outer circumference of the part of the small-diameter fiber 130, which is next to each of the taper fibers 120, so as to fill the space therearound. Further, the pressure plate 221 and the pressure plate 222, which are made of aluminum, are placed in contact with the outer surface of the heat-radiation silicon adhesive 223, thereby enhancing the heat radiation effect. Therefore, it is possible to prevent the temperature at the outer circumference of the taper fiber 120 and in the vicinity thereof and the temperature at the outer circumference of a part of the small-diameter fiber 130, which is next to the taper fiber 120, and in the vicinity of the outer circumference of the part of the small-diameter fiber 130 from becoming higher due to light output through the cladding of the taper fiber 120 and through the cladding of the part of the small-diameter fiber 130, which has been attached to the taper fiber 120 by fusion splicing.

Further, the pressure plate 221 and the pressure plate 222 may be cooled in advance by air-cooling, water-cooling or the like.

Figure 3:
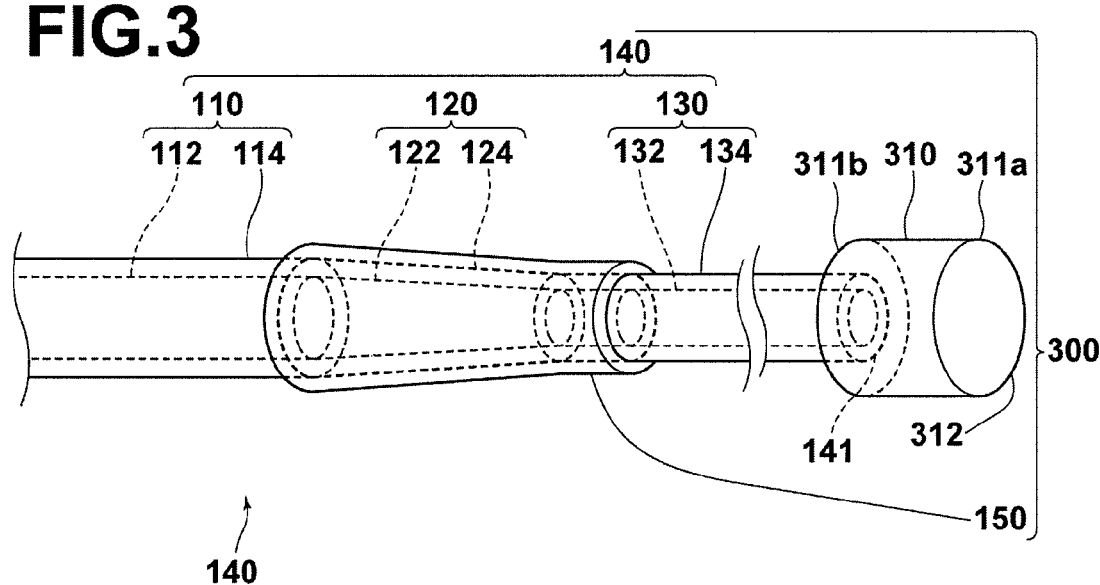
FIG. 3 is a schematic diagram illustrating a third embodiment of the present invention.

Next, an optical fiber part according to a third embodiment of the present invention will be described. FIG. 3 is a schematic diagram illustrating the structure of an optical fiber part 300. The structure of the optical fiber part 300 is the same as that of the optical fiber part 100 illustrated in FIG. 1, except that the optical fiber part 300 includes a transparent member 310 for protecting an end surface, which is arranged on the output end surface. Therefore, in FIG. 3, the same reference numerals as those used in the optical fiber part 100, illustrated in FIG. 1, will be assigned to the corresponding elements, and the explanation thereof will be omitted.

As illustrated in FIG. 3, the optical fiber part 300 includes an optical fiber 140, a heat-radiation silicon adhesive 150, and a transparent member 310 for protecting an end surface. The heat-radiation silicon adhesive 150 has been applied to the outer circumference of the taper fiber 120 in the optical fiber 140 and to the outer circumference of a part of the small-diameter fiber 130, which is next to the taper fiber 120, in the optical fiber 140. The transparent member 310 for protecting an end surface (transparent member 310) is attached to the output end 141 of the optical fiber 140 by optical contact.

The transparent member 310 is a disk-shaped plate made of quartz. Further, a surface 311a of the transparent member 310 for protecting the end surface, the surface 311a being opposite to a surface 311b thereof that is in contact with the output end 141 of the optical fiber 140, is coated with an anti-reflection coating 312.

As described above, the transparent member 310 for protecting the end surface is attached to the output end 141 of the optical fiber 140 by optical contact. Therefore, light output from the output end 141 of the optical fiber 140 is transmitted through the transparent member 310 and output to the outside through the surface 311a of the transparent member 310. Since the output end 141 of the optical fiber 140 is covered with the transparent member 310, it is possible to prevent burning at the output end of the optical fiber due to adhesion of dust or the like thereto.

Further, when a light beam passes through the transparent member 310, the diameter of the light beam increases. Therefore, the density of the light beam at the output position to air, which is the surface 311b in this embodiment, is lower than the density of the light beam output when the transparent member 310 is not provided. Therefore, the transparent member 310 can prevent burning at the surface 311b of the transparent member 310. Further, the transparent member 310 can prevent damage to the anti-reflection coating 312 that has been applied to the surface 311b of the transparent member 310. Further, the transparent member 160 can reduce light that returns from the output surface of the light beam. Therefore, it is possible to prevent damage to the laser connected to the input end of the optical fiber 140.

Figure 4:
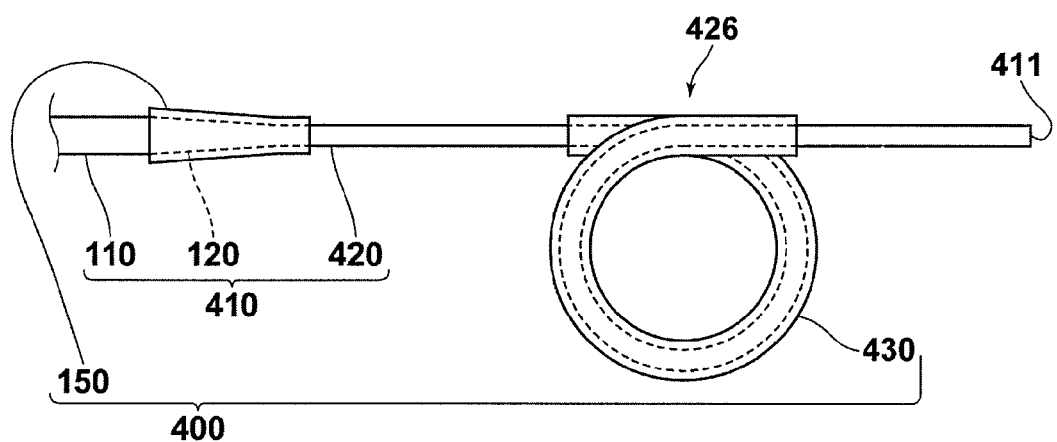
FIG. 4 is a schematic diagram illustrating a fourth embodiment of the present invention.

Next, an optical fiber part according to a fourth embodiment of the present invention will be described. FIG. 4 is a schematic diagram illustrating the structure of an optical fiber part 400. In FIG. 4, the same reference numerals as those used in the optical fiber part 100, illustrated in FIG. 1, will be assigned to the corresponding elements, and the explanation thereof will be omitted.

As illustrated in FIG. 4, the optical fiber part 400 includes an optical fiber 410, a heat-radiation silicon adhesive 150, and a heat-radiation silicon adhesive 430. The optical fiber 410 includes a main fiber 110, a taper fiber 120, and a small-diameter fiber 420 that has a core diameter of 60 μm and an outer diameter of the fiber of 80 μm. Further, the small-diameter fiber 420 has a bent portion 426, in which the fiber is bent (wound, twisted, coiled, or the like) in circle form having a diameter of 10 cm. The heat-radiation silicon adhesive 150 has been applied to the outer circumference of the taper fiber 120 and to a part of the small-diameter fiber 420, which is next to the taper fiber 120. The heat-radiation silicon adhesive 430 has been applied to a portion of the outer circumference of the small-diameter fiber 420, the portion forming the bent portion 426.

Light that propagates through the cladding of the optical fiber 410 is output to the outside of the cladding at the bent portion 426. Therefore, it is possible to prevent the light that propagates through the cladding from being output, as noise light, from the output end 411 of the optical fiber 410. Further, since the heat-radiation silicon adhesive 430, which is made of a highly heat-conductive material having heat conductivity of 3 W/m·K or higher, has been applied to the outer circumference of the bent portion 426, heat generated at the outer circumference of the bent portion 426 and in the vicinity thereof is efficiently conducted (transferred). Therefore, heat does not remain in the vicinity of the outer circumference of the bent portion 426, thereby suppressing an increase in the temperature at the outer circumference of the bent portion 426 and in the vicinity thereof. Further, since the heat-radiation silicon adhesive 430 has been applied to the outer circumference of the bent portion 426, there is low risk that the heat-radiation silicon adhesive 430 detaches from the bent portion. Hence, it is possible to make the optical fiber part 400 more reliable.

In each of the aforementioned embodiments, the heat-radiation silicon adhesive has been applied to the taper fiber 120 and to a part of the small-diameter fiber, which is next to the taper fiber 120, or the heat radiation silicon adhesive has been applied to the outer circumference of the bent portion 426. However, the present invention is not limited to the aforementioned embodiments. For example, heat-radiation silicon grease, a heat-radiation sheet, an epoxy-based adhesive including a heat-conductive filler, and the like may be used.

What is claimed is:

1. An optical fiber part comprising: an optical fiber including a main fiber, a taper fiber and a small-diameter fiber; and a heat radiation structure that is provided at the outer circumference of the taper fiber, wherein the main fiber includes a core having a first core diameter, and wherein the taper fiber is connected to one of the ends of the main fiber and includes a core having a core diameter that decreases along an optical axis from the first core diameter to a second core diameter that is smaller than the first core diameter, and wherein the small-diameter fiber is connected to one of the ends of the taper fiber and includes a core having the second core diameter; wherein the heat radiation structure is made of a highly heat-conductive silicon adhesive material having heat conductivity of 4 W/m·K or higher that is in contact with the outer circumference of the taper fiber.

2. An optical fiber part, as defined in claim 1, wherein the highly heat-conductive material has been applied to the outer circumference of the taper fiber.

3. An optical fiber part, as defined in claim 1, wherein the small-diameter fiber has a bent portion, and wherein the heat radiation structure is provided at the outer circumference of the bent portion.

4. An optical fiber part, as defined in claim 3, wherein the heat radiation structure is made of a highly heat-conductive material having heat conductivity of 3 W/m·K or higher that is in contact with the outer circumference of the bent portion.

5. An optical fiber part, as defined in claim 4, wherein the highly heat-conductive material has been applied to the outer circumference of the bent portion.

6. An optical fiber part, as defined in claim 1, wherein a transparent member for protecting an end surface is attached to an output end surface of the optical fiber by optical contact.

7. An optical fiber part, as defined in claim 6, wherein an anti-reflection coating is provided on the output-side surface of the transparent member for protecting the end surface.

8. An optical fiber part, as defined in claim 1, wherein the power of light output from the optical fiber is greater than or equal to 1 W.

9. A laser processing machine comprising:
the optical fiber part as defined in claim 1; and
a laser that outputs laser light to be transmitted through the optical fiber part.

* * * * *